United States Patent
Marks et al.

(10) Patent No.: US 11,396,878 B2
(45) Date of Patent: *Jul. 26, 2022

(54) FLUID PUMP ASSEMBLY

(71) Applicant: EcoTech, Inc., Allentown, PA (US)

(72) Inventors: Timothy Marks, Northampton, PA (US); Patrick Clasen, Allentown, PA (US); Justin Lawyer, Bethlehem, PA (US)

(73) Assignee: EcoTech, Inc., Bethlehem, PA (US)

( * ) Notice: Subject to any disclaimer, the term of this patent is extended or adjusted under 35 U.S.C. 154(b) by 113 days.

This patent is subject to a terminal disclaimer.

(21) Appl. No.: 16/695,841

(22) Filed: Nov. 26, 2019

(65) Prior Publication Data

US 2020/0095996 A1 Mar. 26, 2020

Related U.S. Application Data

(63) Continuation of application No. 16/134,246, filed on Sep. 18, 2018, now Pat. No. 10,487,836, which is a
(Continued)

(51) Int. Cl.
*F04D 13/02* (2006.01)
*F04D 29/046* (2006.01)
(Continued)

(52) U.S. Cl.
CPC ........... *F04D 13/027* (2013.01); *A61H 33/60* (2013.01); *F04D 13/026* (2013.01); *F04D 13/0666* (2013.01); *F04D 29/026* (2013.01); *F04D 29/043* (2013.01); *F04D 29/046* (2013.01); *F04D 29/0413* (2013.01); *F04D 29/0465* (2013.01); *F04D 29/20* (2013.01); *F04D 29/426* (2013.01); *F04D 29/445* (2013.01); *F04D 29/448* (2013.01); *F04D 29/605* (2013.01); *F04D 29/628* (2013.01); *H02K 1/22* (2013.01);
(Continued)

(58) Field of Classification Search
CPC .... F04D 13/024; F04D 13/026; F04D 25/026; F04D 29/043; F04D 29/0465; F04D 29/20; F04D 29/448; F04D 29/628; F04D 29/605; F04D 29/0413; F04D 13/027; F04D 13/0666; F04D 13/08; F04D 29/046; F04D 29/445; F04D 29/426; F04D 29/026; H02K 49/108; H02K 49/106; H02K 5/12; H02K 7/14; H02K 1/22; A01K 63/047; A61H 33/60; A61H 35/006; A61H 2201/1215
See application file for complete search history.

(56) References Cited

U.S. PATENT DOCUMENTS 2,506,886 A 4/1948 Zozulin et al.
2,494,086 A * 1/1950 Curtis .................... F04D 9/002
222/188

(Continued)

*Primary Examiner* — Nathan C Zollinger
(74) *Attorney, Agent, or Firm* — Berenato & White, LLC

(57) ABSTRACT

A fluid pump assembly is provided. The pump has a pair of units magnetically coupled to each other. The first unit contains a drive motor and a magnetic assembly. The second unit contains a magnetic assembly and a blade of a propeller/impeller for imparting movement to a fluid. As the first unit is activated by the drive motor, a magnetic flux is created which in turn rotates the magnetic assembly in the second unit, driving the blade.

17 Claims, 11 Drawing Sheets

Related U.S. Application Data continuation of application No. 15/413,574, filed on Jan. 24, 2017, now Pat. No. 10,077,775, which is a continuation of application No. 14/264,744, filed on Apr. 29, 2014, now Pat. No. 9,551,343, which is a continuation of application No. 13/036,432, filed on Feb. 28, 2011, now Pat. No. 8,708,672.

(60) Provisional application No. 61/309,133, filed on Mar. 1, 2010.

(51) Int. Cl.

| | | |
|---|---|---|
| *F04D 29/20* | (2006.01) | |
| *F04D 29/62* | (2006.01) | |
| *F04D 29/041* | (2006.01) | |
| *F04D 29/02* | (2006.01) | |
| *F04D 29/42* | (2006.01) | |
| *A61H 33/00* | (2006.01) | |
| *F04D 13/06* | (2006.01) | |
| *F04D 29/043* | (2006.01) | |
| *F04D 29/44* | (2006.01) | |
| *H02K 49/10* | (2006.01) | |
| *F04D 29/60* | (2006.01) | |
| *H02K 1/22* | (2006.01) | |
| *A01K 63/04* | (2006.01) | |
| *A61H 35/00* | (2006.01) | |
| *F04D 13/08* | (2006.01) | |

(52) U.S. Cl.
CPC .......... *H02K 49/108* (2013.01); *A01K 63/047* (2013.01); *A61H 35/006* (2013.01); *A61H 2201/1215* (2013.01); *F04D 13/08* (2013.01)

(56) References Cited

U.S. PATENT DOCUMENTS

| | | | |
|---|---|---|---|
| 3,089,514 A | 5/1963 | Sudmeier | |
| 3,198,125 A | 8/1965 | Yuza et al. | |
| 3,321,081 A | 5/1967 | Willinger | |
| 3,373,927 A | 3/1968 | Miller | |
| 3,420,184 A | 1/1969 | Englesberg et al. | |
| 3,481,586 A | 12/1969 | Roberts | |
| 3,932,068 A | 1/1976 | Zimmermann | |
| 4,024,064 A | 5/1977 | Rakowicz et al. | |
| 4,226,574 A * | 10/1980 | Villette | F04D 7/06 310/104 |
| 4,982,461 A | 1/1991 | Mikiya et al. | |
| 4,998,863 A | 3/1991 | Klaus | |
| 5,131,821 A | 7/1992 | Marioni | |
| 5,269,664 A | 12/1993 | Buse | |
| 6,447,027 B1 | 9/2002 | Lilley et al. | |
| 7,152,276 B2 | 12/2006 | Jin | |
| 7,249,571 B2 | 7/2007 | Allis | |
| 7,393,188 B2 | 7/2008 | Lawyer et al. | |
| 8,214,937 B2 | 7/2012 | Lawyer et al. | |
| 8,607,374 B2 | 12/2013 | Lawyer et al. | |
| 8,708,672 B2 * | 4/2014 | Marks | F04D 29/0413 417/420 |
| 9,551,343 B2 * | 1/2017 | Marks | F04D 13/026 |
| 10,077,775 B2 * | 9/2018 | Marks | F04D 13/0666 |
| 10,487,836 B2 * | 11/2019 | Marks | F04D 13/0666 |
| 2002/0097372 A1 | 7/2002 | Zelman | |
| 2004/0018104 A1 | 1/2004 | Watkins | |
| 2005/0120473 A1 | 6/2005 | Southon et al. | |
| 2005/0276703 A1 | 12/2005 | Lee | |
| 2006/0013714 A1 | 1/2006 | Wu | |
| 2006/0057006 A1 | 3/2006 | Williams et al. | |
| 2006/0210412 A1 | 9/2006 | Lawyer et al. | |
| 2007/0136943 A1 | 6/2007 | Long | |
| 2007/0136944 A1 | 6/2007 | Long | |
| 2009/0064406 A1 * | 3/2009 | Lawyer | A61H 33/0091 4/541.1 |
| 2009/0097372 A1 | 4/2009 | Watabe | |

\* cited by examiner

FLUID PUMP ASSEMBLY

CROSS-REFERENCE TO RELATED APPLICATION AND CLAIM TO PRIORITY

This application is a continuation of U.S. application Ser. No. 16/134,246 filed Sep. 18, 2018, now U.S. Pat. No. 10,487,836, which is a continuation of U.S. application Ser. No. 15/413,574 filed Jan. 24, 2017, now U.S. Pat. No. 10,077,775, which is a continuation of U.S. application Ser. No. 14/264,744 filed Apr. 29, 2014, now U.S. Pat. No. 9,551,343, which is a continuation of U.S. application Ser. No. 13/036,432 filed Feb. 28, 2011, now U.S. Pat. No. 8,708,672, which is based on Provisional Application No. 61/309,133, filed on Mar. 1, 2010, the disclosures of which are incorporated herein by reference and to which priority is claimed.

FIELD OF THE INVENTION

The present invention relates to fluid pump assemblies, especially to magnetically coupled liquid pump assemblies useful with, for example, aquariums, foot spa basins and the like.

BACKGROUND

Fluid pump assemblies come in various designs depending on their operating requirements and the environment in which they will be used. One type of fluid pump assembly utilizes separate first and second units which are operably connected to each other by magnets. The first unit is designed to be placed outside of a fluid-holding container, while the second unit is placed inside of the container. Each unit possesses a respective magnet operatively connected to one another such that a magnetic attraction between the magnets holds the first and second units in place on opposite sides of the container. The first unit contains a drive motor that rotates the first unit magnet. Due to the operative connection between magnets, the second unit magnet rotates with the first unit magnet. The second unit magnet may be connected to a propeller or an impeller to impart movement to the liquid in the container.

The above-described fluid pump assembly is particularly useful in aquariums and the like because the attractive forces between the magnets allow the respective units to be held in place at any position along the walls of the container without requiring holes to be formed in the container. The magnetic attractive force also allows the fluid pump assembly to be mounted without brackets or other mechanical mounts, thereby reducing the overall weight of the assembly. Further, the fluid pump assembly may be located at any location on the container, such as in close proximity to an electrical outlet for powering the drive motor. The above-described magnetic coupling also eliminates the need to submerge electrical components in water, thus making hermetic seals about the motor housing unnecessary.

SUMMARY

In accordance with a first aspect of the invention, a magnetically driven unit of a fluid pump assembly is provided. The driven unit features a housing including a base and a nozzle extending from the base. A rotator is at least partially contained in the housing. The rotator includes a magnet constructed and arranged to be magnetically coupled to and rotationally driven by a magnet of a drive unit. A shaft is operatively connected to the rotator to rotate when the rotator is rotationally driven. A blade is operatively coupled with the shaft to move with the rotating shaft, and a magnet cover cooperates with the housing to enclose the rotator.

In accordance with a second aspect of the invention, a magnetically driven unit of a fluid pump assembly is provided. The magnetically driven unit features a housing including a base and a nozzle extending from the base, and a rotator at least partially contained in the housing. The rotator includes a magnet constructed and arranged to be magnetically coupled to and rotationally driven by a magnet of a drive unit. The driven unit further includes a shaft operatively connected to the rotator to rotate when the rotator is rotationally driven, a blade operatively coupled with the shaft to move with the rotating shaft, and an axle operably associated with the shaft, wherein the bottom of the axle comprises a flanged base.

In accordance with additional aspects of the invention, fluid pump assemblies featuring drive units and driven units are provided.

Other aspects of the invention, including assemblies, subassemblies, drive units, driven units, apparatus, systems, kits, methods, and the like which constitute part of the invention, will become more apparent upon reading the following detailed description of the exemplary embodiments and viewing the drawings.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENT(S) AND EXEMPLARY METHOD(S)

Figure 1:
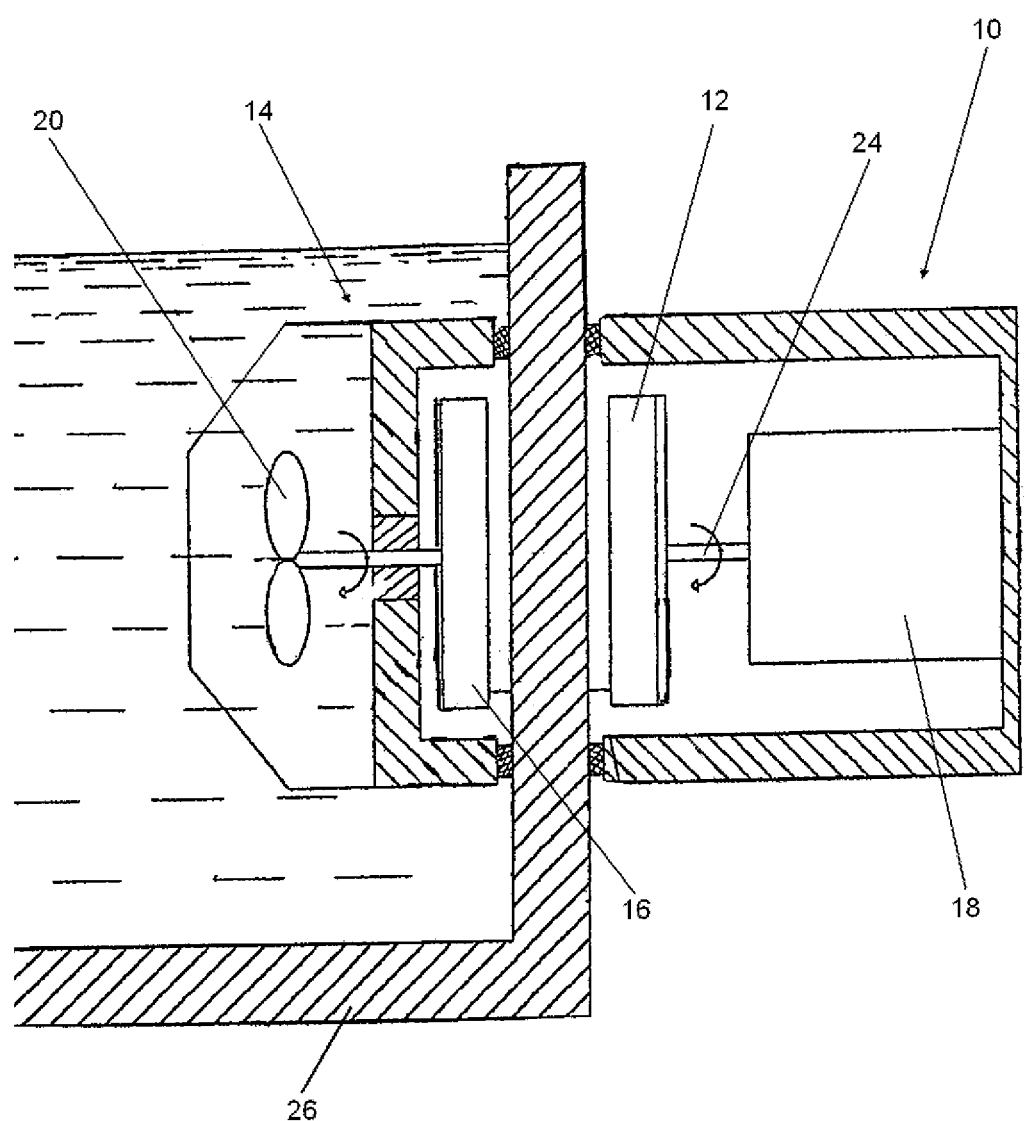
FIG. 1 is a schematic sectional view of a pump assembly in operation in relationship to a fluid-filled container in accordance with an exemplary embodiment of the invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

As best shown in FIG. 1, an exemplary fluid pump assembly is shown in operation in relationship to a container 26 filled with a fluid such as water. The fluid pump assembly includes a dry-side unit or drive unit 10 containing a dry-side magnet 12 outside of the container 26, and a wet-side unit or driven unit 14 containing a wet-side magnet 16 inside of the container 26. The wet-side magnet 16 is operatively associated with a blade 20 for imparting movement to the fluid in the container 26. The dry-side magnet 12 is connected to a drive shaft 24 that is driven by a motor 18. In an exemplary embodiment, the dry-side magnet 12 is a circular disc having at least one pair of magnetic poles N and S. The magnetic poles may be arrayed radially about the disc, with the poles arranged in an equal and opposite fashion. The dry-side magnet 12 may be made from a variety of magnetic materials, including neodymium or other high performance magnetic materials.

The drive motor 18 may be electric, hydraulic, pneumatic, etc. In an exemplary embodiment, the drive motor 18 is an AC or DC powered electric motor connectable to an electrical outlet or battery. The motor 18 is rotationally connected to the drive shaft 24 on which the dry-side magnet 12 is mounted or connected. Operation of the motor 18 rotates the drive shaft 24, which in turn rotates the dry-side magnet 12 about the drive shaft axis to create magnetic flux. Optionally, the motor 18 may be shielded with a cover (discussed below) to prevent the magnetic flux from adversely affecting the motor 18 and to reduce motor noise. The cover may be made out of, for example, steel or other suitable shielding materials.

The dry-side or drive unit 10 may be permanently or releasable secured to the wall of the container 26. Alternatively, the dry-side unit 10 and the wet-side unit 14 are placed on opposite sides of the container 26, and the magnetic attraction between the respective magnets 12, 16 retains the units 10, 14 in place, optionally without any mechanical mounts or adhesive. When the fluid pump assembly is activated, the drive motor 18 rotates the dry-side magnet 12, which causes the wet-side magnet 16 and blade 20 to rotate. In operation, the rotational movement of the blade 20 imparts movement to the liquid in the container 26.

The magnetic attraction between the magnets 12, 16 should be sufficiently strong to hold the units 10, 14 in place in operation, that is, so that circulation of the liquid in the container 26 and incidental contact do not cause the units 10, 14 to dislodge. For example, the net magnetic attraction between the dry-side unit 10 and the wet-side unit 14 may be at least 1.0 pound. The attractive force may be greater or smaller, as needed depending on factors such as pump size, liquid viscosity, and operating environment.

Figure 2:
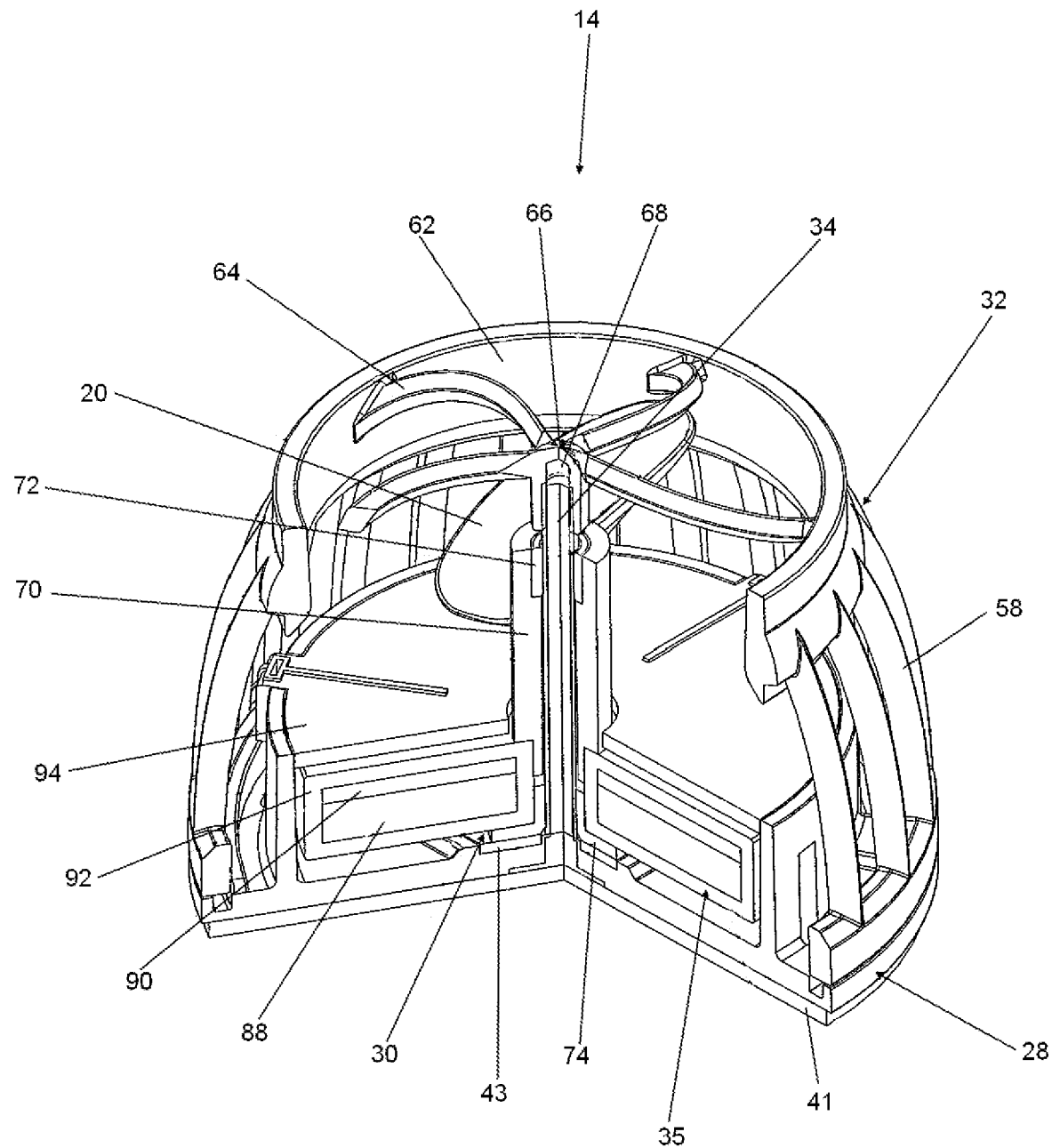
FIG. 2 is a perspective cut-away view of a wet-side unit of the fluid pump assembly of FIG. 1.

FIG. 2 depicts an exemplary wet-side unit 14. As shown, the wet-side unit or driven unit 14 includes a base 28 and a nozzle 32 combining to form a housing, a rotator assembly 30 containing at least one magnet assembly 35, and an axle 34. These components are described in further detail below.

Figure 3:
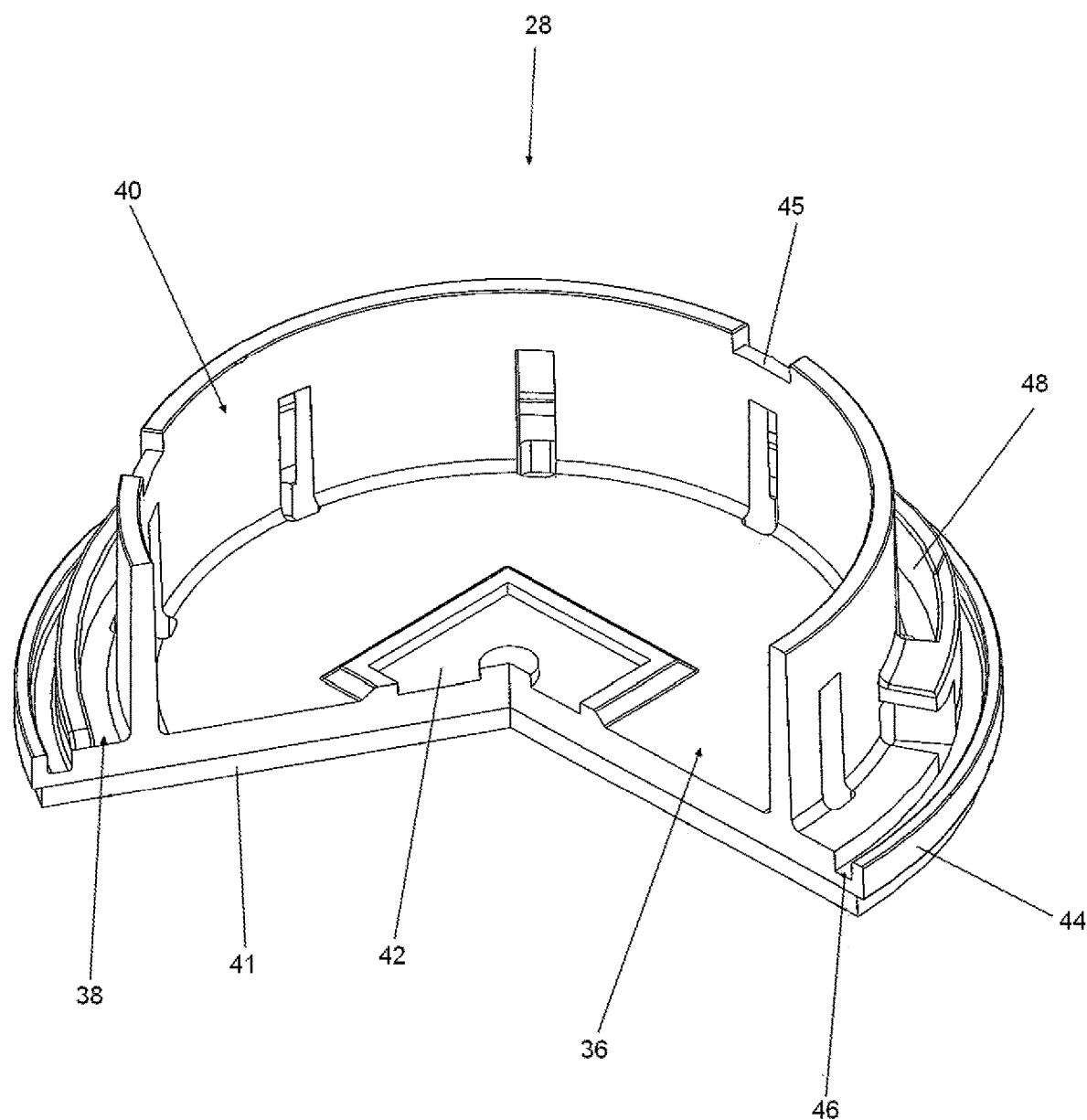
FIG. 3 is a perspective cut-away view of an exemplary base of the wet-side unit of FIG. 2.

As best shown in FIG. 3, the base 28 has an inner region 36, an outer region 38, and a side wall 40. The side wall 40 separates the inner region 36 and the outer region 38. The side wall 40 may be formed integrally as a single piece with the inner region 36 and the outer region 38. Alternatively, the inner region 36, outer region 38, and/or side wall 40 may be formed separately and attached to on another. The inner region 38 and the side wall 40 combine to house the magnet assembly 35 as shown in FIG. 2. In an exemplary embodiment, the side wall 40 has slots 45 for retaining a magnet cover 94 described below.

As best shown in FIGS. 2 and 3, the inner region 36 has a seat 42 for retaining a thrust washer 43 (FIG. 2). The thrust washer 43 distributes the axial load of the rotator assembly 30 and prevents force created by the weight and movement of the rotator assembly 30 from acting directly on the base 28. The thrust washer 43 may be made of a variety of materials, including ceramic, metallic, and/or elastomeric materials. In an exemplary embodiment, a ceramic material having a high quality surface finish is used for the thrust washer 43. Utilizing a ceramic material will greatly reduce friction and wear during operation of the fluid pump assembly.

Figure 4:
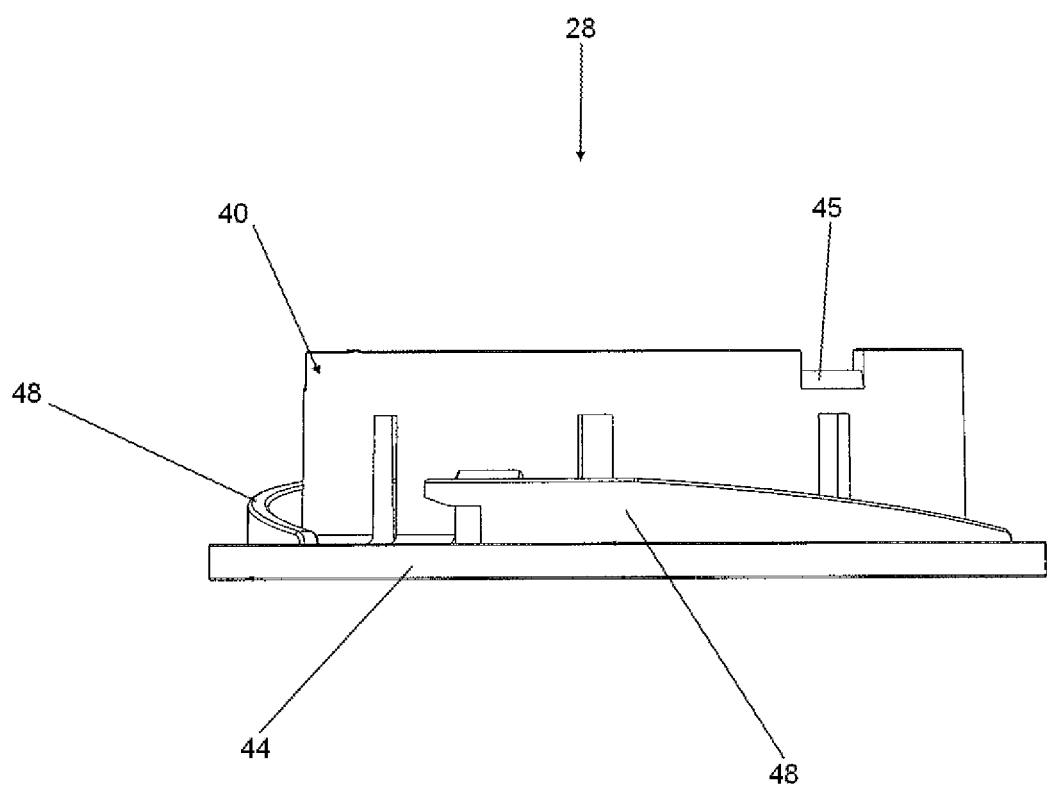
FIG. 4 is a side view of the base of FIG. 3.

The outer region 38 has a peripheral edge 44, a channel 46, and locking grooves 48. The channel 46 holds an o-ring (not shown) for establishing a fluid-tight seal between the base 28 and the nozzle 32. As best shown in FIG. 4, the locking grooves 48 extend around the outer portion 38 of the base 28. There may be any number of locking grooves 48 associated with the base 28. In an exemplary embodiment, three locking grooves 48 extend around the outer region 38 equidistant from each other. As described below, the nozzle 32 includes locking tabs 50 (FIG. 5) that rotatably engage the locking grooves 48 to releasably connect the nozzle 32 to the base 28. The number and spacing of the locking tabs 50 on the nozzle 32 should correspond to the number and spacing of the locking grooves 48.

In an exemplary embodiment, a backing member 41 is attached to the bottom of the base 28, that is, on an opposite surface of the base 28 relative to the side wall 40. The backing member 41 may be constructed of a material and/or structure that reduce rotational and translational movement during operation of the fluid pump assembly. The backing member 41 may be made from a variety of suitable materials including an elastomer such as neoprene or any suitable type of resilient material such as foam. Although not shown, the backing member 41 may be structured as a plurality of separate elements, such as projections, formed integrally with or separately attached to the base 28. The projections may correspond with similar sized and placed depressions in the wall of the container 26 to further resist displacement of the wet-side unit 14.

Figure 5:
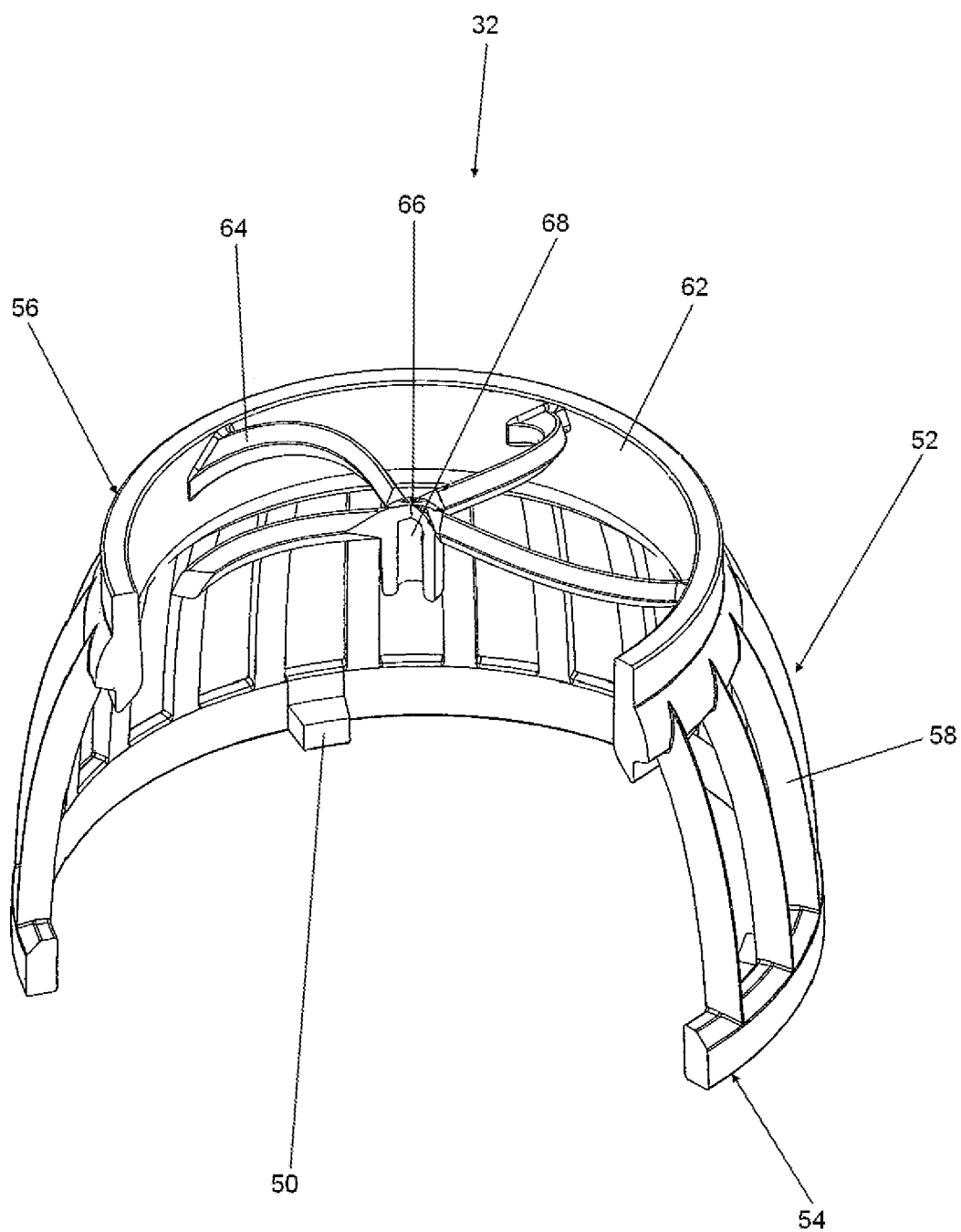
FIG. 5 is a perspective cut-away view of an exemplary nozzle of the wet-side unit of FIG. 2.

As best shown in FIG. 2, the nozzle 32 connects to the base 28 as described above to form the housing of the wet-side unit 14. The nozzle 32 surrounds the axle 34 and the rotator assembly 30. The nozzle 32 may serve as a protective cage to keep blade 20 from contacting anything, apart from the liquid, inside of the container 26 in which the wet-side unit 14 is placed. As best shown in FIG. 5, the nozzle 32 may have a base section 54, an end section 56, and a central section 52 extending between the base section 54 and the end section 56. In an exemplary embodiment, the central section 52, base section 54, and end section 56 are integrally formed as a single monolithic piece, though the sections 52, 54, 56 may be formed separately and connected together. Additionally, one or more of the sections 52, 54, 56 may be releasably connected to one another so that they may be changed by a user depending on the desired operation. The nozzle 32 may be made from a polymeric material and formed through a modeling process, though other suitable materials and methods of manufacture will be understood by those of ordinary skill in the art.

The locking tabs 50 of the base section 54 may be engaged with the locking grooves 48 to facilitate the connection between the nozzle 32 and the base 28, as discussed above. The central section 52 forms the body of the nozzle 32 and may take the form of a series of ribs 58. The ribs 58 extend longitudinally along the nozzle 32 and create slots or openings. The ribs 58 may also be tilted or angled to direct the flow of the fluid through the openings. Accordingly, the ribs 58 can be designed and arranged to influence flow and turbulence, reduce d noise, and affect efficiency of the fluid pump assembly.

Depending on the application of the fluid pump assembly, the end section 56 may have a number of different designs. As best shown in FIG. 5, the end section 56 has a top wall 62 and a series of arms 64 projecting from the top wall 62 to a central hub 66. In an exemplary embodiment, the openings between the ribs 58 act as liquid intake areas and the openings between the arms 64 act as liquid output areas. These arms 64 may be curved and twisted as shown in FIG. 5 to impart a specific flow to the fluid leaving the nozzle 32. As with the ribs 58, the arms 64 can be designed to affect flow, noise, and efficiency of the fluid pump assembly.

The central hub 66 may have a hollow cylindrical portion which extends towards the base 28, forming an upper constraint 68. This upper constraint 68 receives the top portion of the axle 34, as best shown in FIG. 2, to keep the axle 34 from moving laterally and optionally to partially or wholly support the axle 34. Alternatively, the axle 34 may be supported solely by its flanged base 84 as discussed in greater detail below.

The design of the end section 56 shown in FIG. 5 is particularly useful for use with foot spa tub to impart a specific flow of fluid to a user's feet. The design may be altered to make it more suitable for aquarium use. Specifically, in the context of use with an aquarium, the space between the arms 64 should be sufficiently small to prevent fish from coming into contact with the blade 20. Additional arms 64 may be provided to reduce the spacing between the arms, thereby making the blade 20 inaccessible to fish while permitting the flow of fluid.

Figure 6:
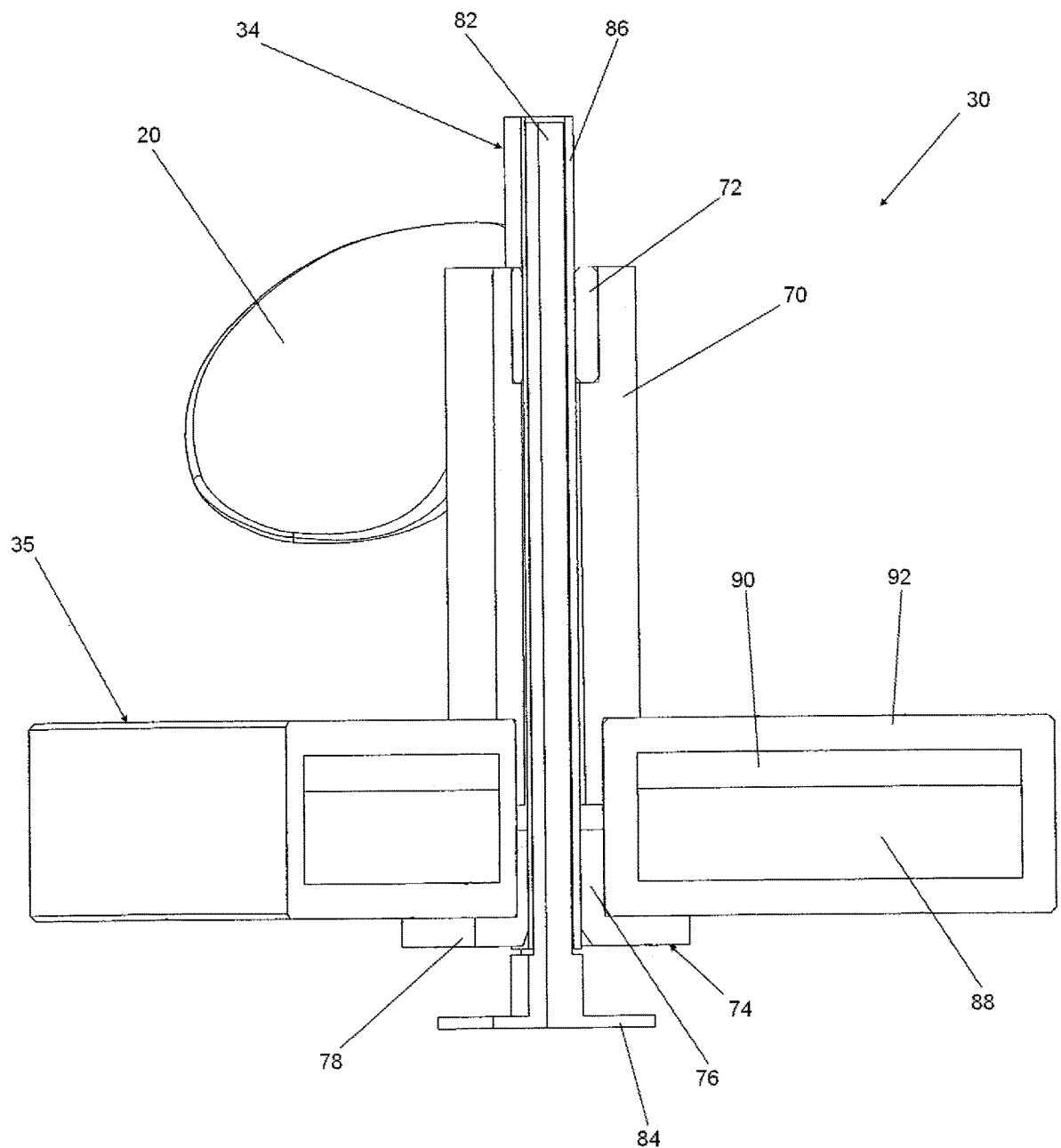
FIG. 6 is a side sectional view of an exemplary axle and rotator assembly of the wet-side unit.

As best shown in FIG. 6, the rotator assembly 30 includes a magnet assembly 35, a blade 20 for imparting movement to the fluid in the container 26, a shaft 70, an upper bearing 72, and a lower bearing 74. While multiple bearings 72, 74 are shown, a single bearing may be used for certain applications. In these instances, the single bearing may be an upper bearing, a lower bearing, or a continuous bearing extending from about the top of the shaft 70 to about the bottom of the shaft 70. The upper bearing 72 may be made from a ceramic, such as alumina oxide, to reduce wear and provide low friction. The shaft 70 and the lower bearing 74 connect to the magnet assembly 35. This connection may be achieved through a press fit, adhesive, molded, or other suitable connection. In an exemplary embodiment the blades 20 may be integrally formed with the shaft 70, for example, as a molded, monolithic singe piece. Alternatively, the blades 20 may be formed separately from and connected or fastened to the shaft 70. The blade 20 may be either an impeller type or a propeller type depending on the application of the fluid pump assembly. Also, the specific configuration and number of blades 20 may vary depending on the application.

Figure 7:
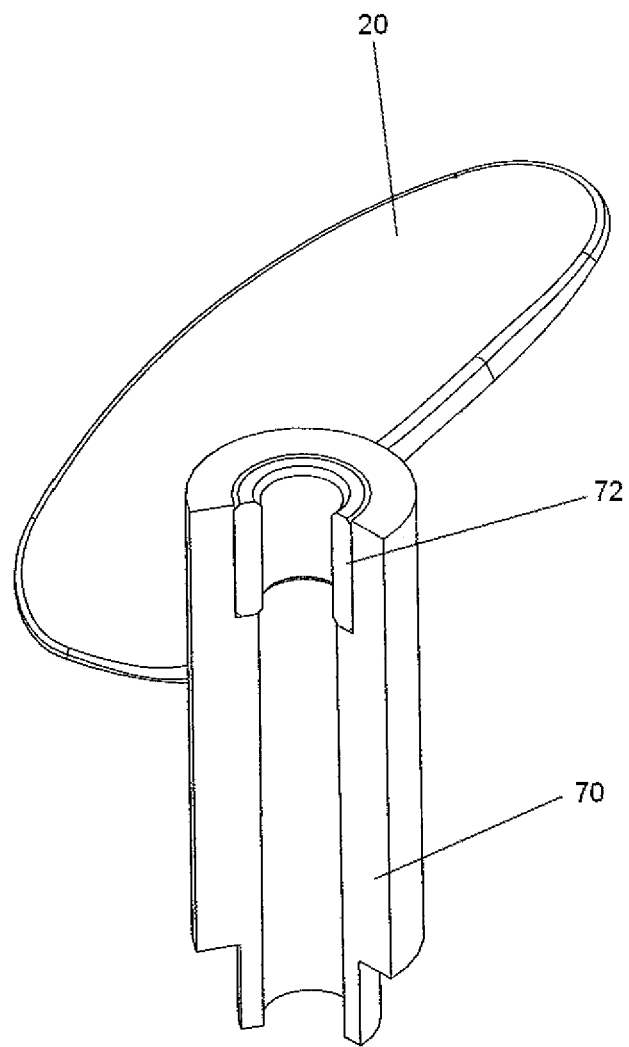
FIG. 7 is a perspective partially cut-away view of an exemplary bearing and shaft with attached blade of the axle and rotator assembly of FIG. 6.

The upper bearing 72 is located inside of the shaft 70, as best shown in FIGS. 6 and 7. The upper bearing 72 dampens forces imparted from the shaft 70 to the axle 34. In an exemplary embodiment the upper bearing 72 is made from a polymeric material; however, other appropriate materials may be used. When choosing the material for the upper bearing 72, the material used for the axle 34 should be taken into consideration, for example, to reduce the amount of transmitted forces and the amount of friction and wear.

Figure 8A:
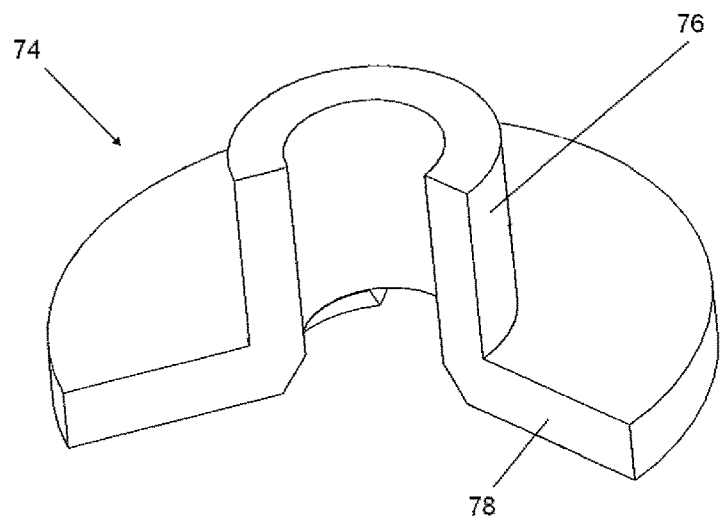
FIG. 8A is an upper perspective, cut-away view of an exemplary lower bearing of the rotator assembly of FIG. 6.
Figure 8B:
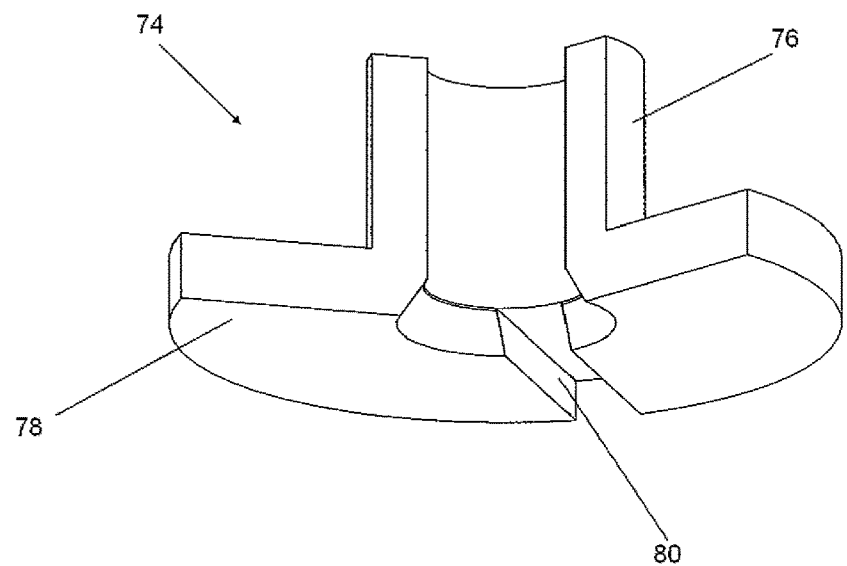
FIG. 8B is a lower perspective, cut-away view of an exemplary lower bearing of the rotator assembly.

The lower bearing 74 rests on the thrust washer 43 and separates the magnet assembly 35 from the base 28, allowing the magnet assembly 35 to rotate relative to the base 28 without producing a large amount of friction and wear and reducing noise. The thrust washer 43 also helps to absorb axial forces transmitted from the rotator assembly 30 through the lower bearing 74 when the pump is in operation. As best shown in FIGS. 8A and 8B, the lower bearing 74 has a cylindrical shaft 76 and a lower flange 78. The lower flange 78 may have a slot 80 formed into the base. The flanged base 78 may prevent or reduce wobble and noise that might otherwise occur during rotation of the rotor. The lower bearing 74 may be made from a variety of suitable materials such as a polymer material that has low water absorption capability, for example, polyether ether ketone (PEEK).

Figure 9:
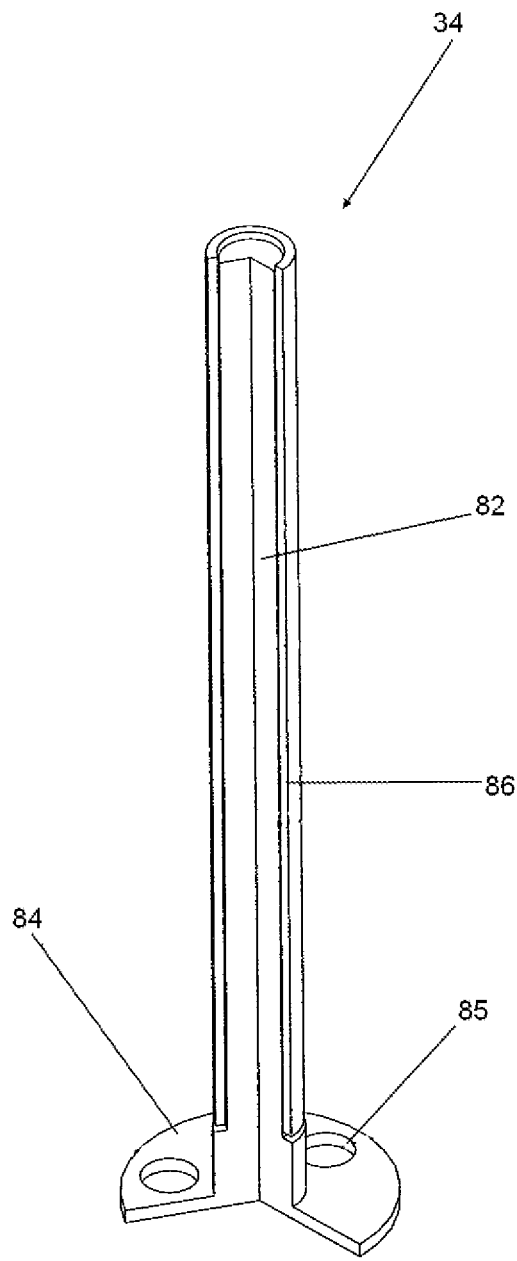
FIG. 9 is a perspective cut-away view of an exemplary axle of the axle and rotator assembly of FIG. 6.

When the fluid pump assembly is switched on, drive motor 18 rotates the dry-side magnet 12, which is magnetically coupled to the wet-side magnet 16 to cause its rotation. The wet-side magnet 16 is coupled to the rotator assembly 30 to cause the rotator assembly 30 to rotate around the axle 34. As best shown in FIG. 9, the axle 34 comprises a shaft 82 and a flanged base 84. In an exemplary embodiment, a sleeve 86 covers at least a portion of the axle shaft 82. The axle 34 extends through the base 28 and connects to the nozzle 32 at the upper constraint 68, as best shown in FIG. 2. The flanged base 84 contacts the bottom of the base 28 and supports the axle 34. In certain embodiments, the axle 34 may be solely supported by the flanged base 84. The flanged base 84 has a number of cut-out sections, embodied as holes 85 in FIG. 9 to assist in locating and anchoring the axle 34 to the base 28. In an exemplary embodiment, the base 28 is formed through an injection molding procedure, such as insert molding. The axle 34 is placed into a mold and material is injected into the mold, forming around the axle 34. The holes 85 allow the material to flow around and through the flanged base 84 to form a secure connection between the axle 34 and the base 28.

The flanged base 84 allows the thickness of the wet-side base 28 to be kept at a minimum, thereby increasing the effectiveness of the magnetic connection between the wet-side unit 14 and the dry-side unit 12. It also helps to prevent unwanted lateral movement or wobble of the rotator assembly 30. This added stability decreases noise produced by the pump.

The axle 34 may be made from a variety of materials including ceramics, polymers, and/or metals. Additionally, the sleeve 86 surrounding the axle 34 may also be made from a variety of materials. In an exemplary embodiment, the axle 34 is made from a metal, such as corrosion resistant stainless steel, and the sleeve 86 is made from a ceramic material, such as aluminum oxide having a high surface finish, for example, between 10 microns and 80 microns, for example 40 microns. Due to the magnetic rotor, which may make the fluid pump assembly heavier than conventional pumps, the surface finish of the bearings 72, 74 and the axle 34 are important to minimizing wear. A ceramic sleeve 86 allows for a high quality surface finish which reduces friction. If the axle 34 is entirely ceramic, however, the axle 34 might not exhibit sufficient strength to prevent it from breaking under the forces generated during operation of the fluid pump assembly. On the other hand, an axle 34 made entirely of a corrosion resistant metal, such as stainless steel or titanium, may not be hard enough or have an appropriate surface finish to wear effectively. Therefore, combining a metal axle 34 with a ceramic sleeve 86 provides a low-friction, high-strength part. This combination prevents failures due to wear and tear caused by the operation of the fluid pump assembly, and thus greatly extends fluid pump assembly life.

As best shown in FIG. 6, the magnet assembly 35 is connected to the rotator shaft 70 and the lower bearing 74. The magnet assembly 35 sits within the interior region 36 of the base 28. In an exemplary embodiment, the magnet assembly 35 comprises a magnet 88 having a plurality of poles. A magnetic shield 90 may be placed on top of the magnet 88. Surrounding the magnet 88 and the magnet shield 90 is a casing 92 which connects to the lower bearing 74 and shaft 70. This connection may be achieved through a press fit, adhesive, molded, or other suitable connection.

Figure 10:
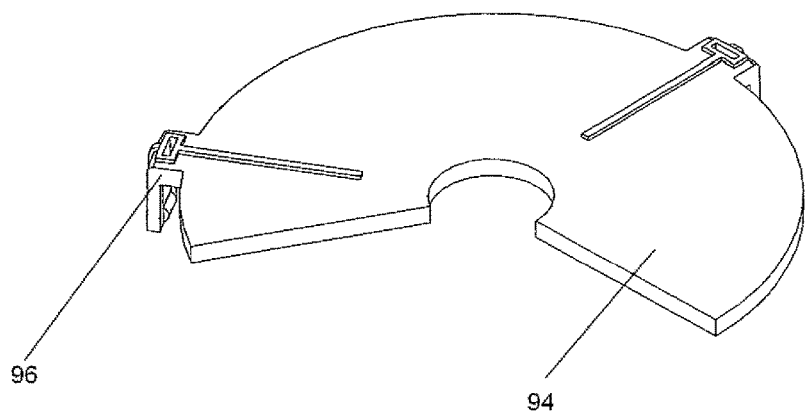
FIG. 10 is a perspective cut-away view of an exemplary magnet cover of the wet-side unit of FIG. 2.
Figure 11:
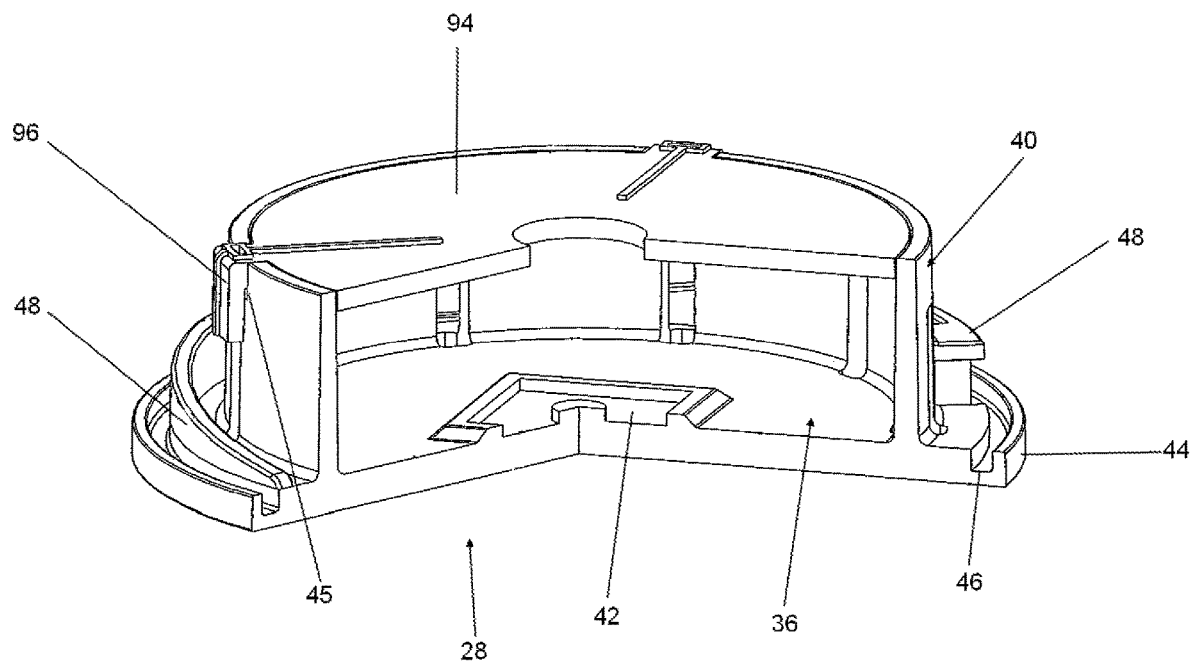
FIG. 11 is a perspective cut-away view of an exemplary magnet cover and base of the wet-side unit of FIG. 2.
Figure 12:
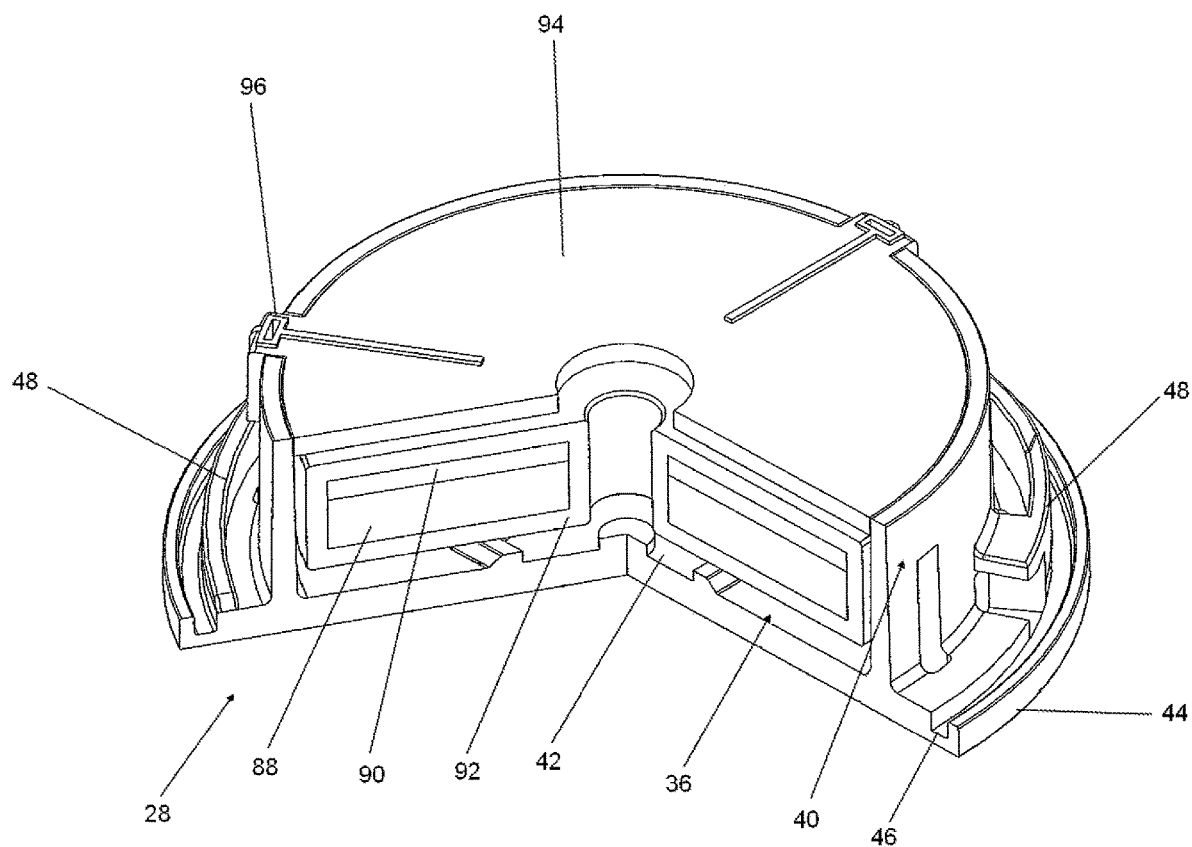
FIG. 12 is a perspective cut-away view of an exemplary magnet cover, base, and magnet assembly.

As best shown in FIGS. 10-12, the wet-side unit 14 is provided with a magnet cover 94. The rotation of the magnet assembly 35 during operation of the fluid pump assembly creates forces that will impart unwanted movement to the fluid, such as turbulence, liquid flow which is counter to the direction of flow from the blade 20, and/or flow through the sides of nozzle 32, all of which may reduce the output efficiency of the fluid pump assembly. By providing the magnet cover 94, flow interaction may be eliminated or greatly reduced. The magnet cover 94 has a set of tabs 96 which correspond to the slots 45 (FIGS. 3 and 4) in the sidewall 40 of the base 28. As best shown in FIG. 12, when the magnet cover 94 and sidewall 40 are connected, they enclose the magnet assembly 35. Cover 94 is therefore fixed, eliminating the occurrence of turbulence that would otherwise arise due to rotation of the magnet assembly 35. Thus, fluid flows as desired from the nozzle 32. The cover may be made from a polymer material or from a water resistant metal such as stainless steel.

By utilizing the various exemplary aspects discussed above, a magnetically coupled fluid pump assembly may be produced which has greater efficiency, better durability, and operates more quietly than previous pumps. The foregoing description of the exemplary embodiments of the present invention has been presented for the purpose of illustration. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. Moreover, features or components of one embodiment may be provided in another embodiment. Thus, the present invention is intended to cover all such modification and variations.

What is claimed is:

1. A magnetically driven unit comprising:
    a housing comprising a base and a nozzle;
    a rotator at least partially contained in the housing, the rotator comprising a magnet constructed and arranged to be magnetically coupled to and rotationally driven by a magnet of a drive unit;
    a shaft operatively connected to the rotator;
    a blade operatively coupled with the shaft;
    an axle concentrically surrounded by the shaft, wherein the axle has a first end supported on the base and a second end supported by the nozzle; and
    a sleeve concentric with the axle and the shaft, and interposed between the axle and the shaft.

2. The magnetically driven unit of claim 1, further comprising a magnet cover cooperating with the base and enclosing the rotator.

3. The magnetically driven unit of claim 1, wherein the axle comprises a flanged base.

4. The magnetically driven unit of claim 3, wherein the flanged base contacts a surface of the base.

5. The magnetically driven unit of claim 1, wherein at least a portion of the sleeve is concentric with and surrounded by a bearing.

6. The magnetically driven unit of claim 3, wherein the axle comprises a metallic material.

7. The magnetically driven unit of claim 1, wherein the nozzle comprises a plurality of ribs spaced apart from one another to create openings for allowing fluid to flow therethrough.

8. The magnetically driven unit of claim 1, further comprising a casing surrounding the magnet of the rotator.

9. The magnetically driven unit of claim 1, further comprising a lower bearing connected to the rotator.

10. A fluid pump assembly, comprising:
    the magnetically driven unit of claim 1; and
    the drive unit comprising the drive unit magnet for magnetically coupling to and rotationally driving the blade of the magnetically driven unit.

11. The magnetically driven unit of claim 1, wherein the sleeve comprises a ceramic.

12. The magnetically driven unit of claim 1, wherein the axle comprises a metallic material.

13. The magnetically driven unit of claim 1, wherein the base and the nozzle are releasably connected.

14. The magnetically driven unit of claim 1, further comprising a lower bearing concentric with and surrounding the sleeve, wherein the lower bearing is positioned between the magnet of the rotator and the base.

15. The magnetically driven unit of claim 1, further comprising an upper bearing positioned between the shaft and the sleeve.

16. The magnetically driven unit of claim 14, further comprising a thrust washer positioned between the lower bearing and the base.

17. The fluid pump assembly of claim 10, wherein the sleeve comprises a ceramic.

* * * * *